(12) United States Patent
Huenermann

(10) Patent No.: US 7,854,147 B2
(45) Date of Patent: Dec. 21, 2010

(54) METHOD FOR PRODUCING A SEMIFINISHED PRODUCT FOR AN OPTICAL COMPONENT OF HIGH HOMOGENEITY

(75) Inventor: Michael Huenermann, Alzenau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 1082 days.

(21) Appl. No.: 11/516,200

(22) Filed: Sep. 6, 2006

(65) Prior Publication Data

US 2007/0059534 A1    Mar. 15, 2007

(30) Foreign Application Priority Data

Sep. 9, 2005    (DE) ..................... 10 2005 043 289

(51) Int. Cl.
*C03B 37/018*    (2006.01)
(52) U.S. Cl. ........................................ 65/413
(58) Field of Classification Search ................. 65/413, 65/404, 386, 422, 426
See application file for complete search history.

(56) References Cited

U.S. PATENT DOCUMENTS

| | | | | |
|---|---|---|---|---|
| 4,268,112 A * | 5/1981 | Peterson | ...................... | 385/61 |
| 4,465,336 A * | 8/1984 | Huber et al. | .................. | 385/11 |
| 4,772,302 A * | 9/1988 | Abe | .............................. | 65/397 |
| 5,443,607 A | 8/1995 | Englisch et al. | | |
| 5,790,315 A * | 8/1998 | Fujinoki et al. | ............. | 359/664 |
| 6,324,871 B1 * | 12/2001 | Nakamura et al. | ............ | 65/421 |
| 6,336,347 B1 * | 1/2002 | Roba et al. | ..................... | 65/413 |
| 6,474,106 B1 * | 11/2002 | Crossland et al. | ............. | 65/377 |
| 6,508,084 B1 * | 1/2003 | Yokota et al. | ................. | 65/424 |
| 2004/0121247 A1 * | 6/2004 | Berkey et al. | ................... | 430/5 |
| 2006/0048546 A1 | 3/2006 | Hunermann | | |

FOREIGN PATENT DOCUMENTS

| | | |
|---|---|---|
| DE | 42 04 406 A1 | 8/1993 |
| DE | 102 51 390 A1 | 2/2004 |
| EP | 0 673 888 B1 | 5/2000 |

* cited by examiner

*Primary Examiner*—Queenie Dehghan
(74) *Attorney, Agent, or Firm*—Tiajoloff and Kelly LLP

(57) ABSTRACT

Known methods for producing a semifinished product for an optical component of synthetic quartz glass of high homogeneity require a great number of forming or shaping steps for homogenization, which is troublesome in terms of energy and time and entails the risk that impurities might be introduced. To avoid these drawbacks, a method modification is suggested that comprises the following method steps:

Figure 1:
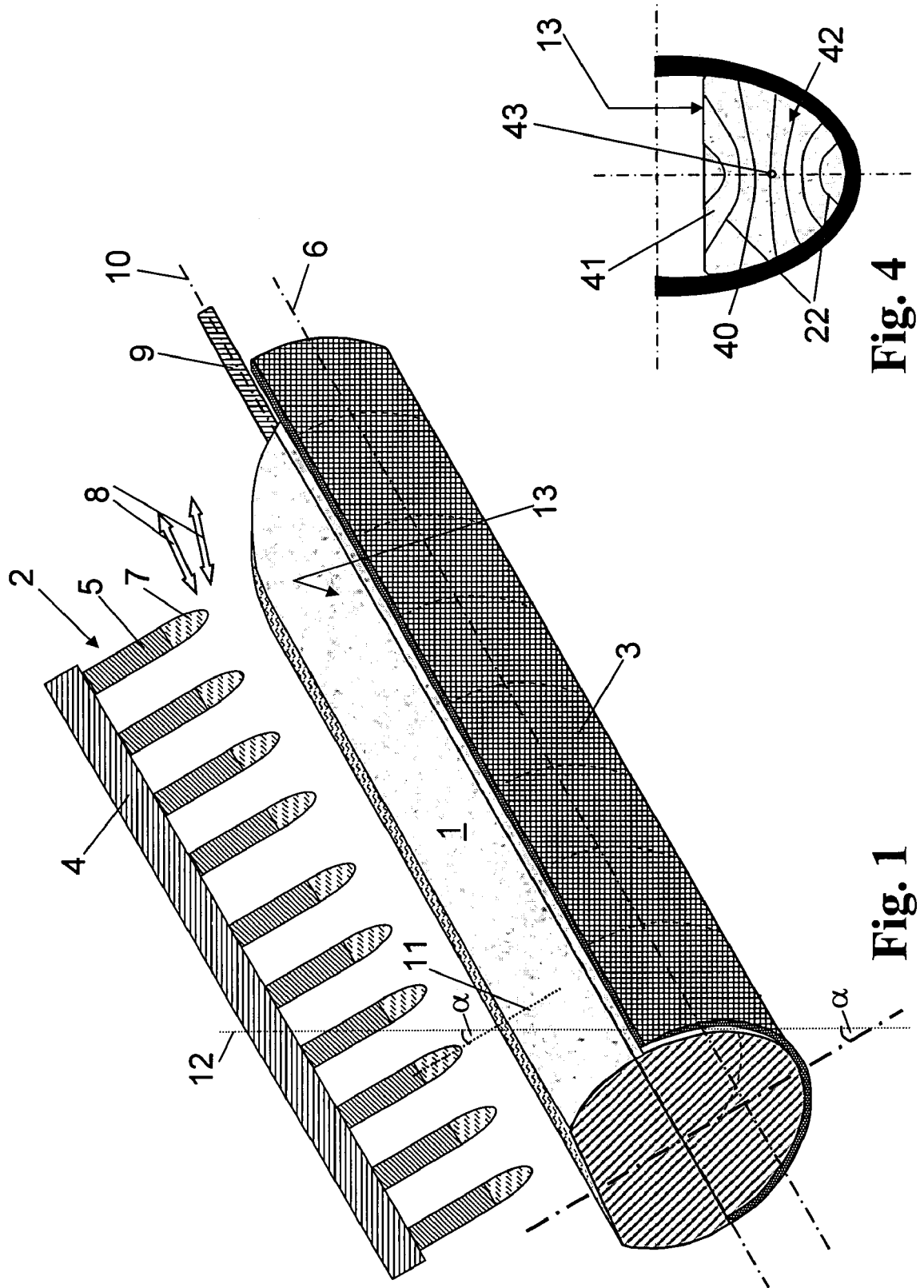

(a) feeding a silicon-containing start compound, which can be converted by oxidation or hydrolysis into $SiO_2$, to a deposition burner, and forming amorphous $SiO_2$ particles in a burner flame assigned to the deposition burner, (b) forming a substantially solid-cylinder $SiO_2$ blank by depositing the $SiO_2$ particles onto a support with a longitudinal axis by way of successive layers, of which most extend in parallel with the longitudinal axis of the support and which extend in the direction of the outer surface of the blank, (c) homogenizing the $SiO_2$ blank, including twisting along an axis of rotation extending coaxially to or in parallel with the longitudinal cylinder axis while forming the semifinished product.

A blank suited for performing the method of the invention and shaped in the form of a substantially solid-cylinder $SiO_2$ soot body from successive $SiO_2$ layers is characterized in that most of the layers extend in parallel with the longitudinal axis of the soot body and in the direction of the outer surface of the soot body.

22 Claims, 2 Drawing Sheets

METHOD FOR PRODUCING A SEMIFINISHED PRODUCT FOR AN OPTICAL COMPONENT OF HIGH HOMOGENEITY

The present invention relates to a method for producing a semifinished product for an optical component of synthetic quartz glass of high homogeneity.

Furthermore, the present invention relates to a blank for an optical component of synthetic quartz glass of high homogeneity in the form of a substantially solid-cylinder $SiO_2$ soot body from successive $SiO_2$ layers.

Moreover, the invention is concerned with an appropriate use of the semifinished product produced according to the invention and of the blank.

Synthetic quartz glass is normally produced by flame hydrolysis or oxidation of a silicon-containing start compound using deposition burners.

An appropriate start substance for producing synthetic quartz glass is silicon tetrachloride ($SiCl_4$). However, a great number of other silicon-organic compounds are also known from which $SiO_2$ can be formed by hydrolysis or oxidation. Chlorine-containing or chlorine-free silanes, silazanes or polysiloxanes should here be mentioned by way of example.

Known manufacturing methods are the VAD (vapor phase axial deposition) method, the OVD (outside vapor phase deposition) method or plasma-supported deposition methods such as the POD (plasma outside deposition) method. Other methods employ molds in which the quartz glass body is built up from the bottom to the top by vertical deposition of $SiO_2$ particles and direct vitrification. In all of these procedures, $SiO_2$ particles are produced by means of one or several deposition burners and deposited in layers on a support which is moved relative to a burner flame. At a sufficiently high temperature in the region of the support surface, the $SiO_2$ particles are directly vitrified ("direct vitrification"). By contrast, in the so-called "soot method" the temperature is so low during deposition of the $SiO_2$ particles that a porous soot layer is obtained which is sintered in a separate method step to obtain transparent quartz glass. Both direct vitrification and soot method yield a dense, transparent synthetic quartz glass of high purity.

Due to the layerwise deposition of $SiO_2$ particles the formation of layered structures that may be noticed as so-called striae is inherent to the said manufacturing methods. Striae show differences in the refractive indices between neighboring layers. As a rule, a distinction can here be made between cylindrical $SiO_2$ blanks with a concentric layered structure and those with an axial layered structure. In the OVD method a layered structure is e.g. produced with a spiral layer extending substantially concentrically relative to the longitudinal axis of the blank in that $SiO_2$ particles are deposited layerwise on the outer cylindrical surface of the support rotating about its longitudinal axis. By contrast, in the VAD method in which an $SiO_2$ solid cylinder is built up in the direction of the longitudinal axis of the cylinder by axial deposition on a disk-like rotating support, a helical layered structure with axially succeeding layers is normally obtained, the layers extending in a direction perpendicular to the longitudinal axis of the cylinder.

High demands are made on the refractive index homogeneity in the case of synthetic quartz glass used in microlithography or for optical components in communications engineering. Therefore, the layers that are first present due to the manufacturing process must be removed as completely as possible. Due to its viscosity, which is also low at very high temperatures, it is not possible to homogenize quartz glass by way of standard refining methods. Therefore, quartz glass is homogenized by multidimensional deformation of a hot quartz glass mass. In the simplest case this is done by twisting a zonewise-softened rod-like quartz glass body about the longitudinal axis of the rod. In this way, however, it is neither possible to eliminate a concentrically spiral layer structure (OVD method) nor an axially helical layer structure (VAD method).

That is why multi-step deformation processes have been suggested, for instance in DE 42 04 406 A1, for eliminating layers in quartz glass cylinders. A twist bar with an axial layered structure is here shaped in a further homogenization step by means of a casting mold of graphite having a vertically oriented supply nozzle that is branched at its lower end at two sides into a horizontally oriented tubular outlet mold of a square cross-section.

The twist bar is softened inside the supply nozzle, thereby immersing under its own weight into the horizontal outlet mold in such a manner that the horizontal orientation of the layered structure is maintained, whereas the orientation of the longitudinal axis of the bar is shifted by 90°. This results by way of shaping in a bar-shaped quartz glass cylinder of a square cross-section in the case of which the remaining layers extend in parallel to the longitudinal axis of the bar. A layered structure with such an orientation can be easily eliminated by way of twisting. Therefore, the quartz glass cylinder can be twisted in a further homogenization step about its longitudinal cylinder axis in such a manner that the layers are eliminated in the final product in three directions extending perpendicular to one another.

A method used without tools for homogenizing a striae-prone quartz glass body by way of multidimensional upsetting or compression and elongation of a softened quartz glass mass is also described in EP 673 888 A1. A cylindrical initial body of quartz glass is here compressed along a first axis substantially without any tool to obtain a ball-shaped quartz glass mass and is then pulled into a cylinder along a second axis extending in a direction perpendicular to the first axis. This sequence of the homogenizing steps is repeated several times. In this method, homogenization is in the final analysis due to an appropriate reorientation of the longitudinal axis of the cylinder while maintaining the layer orientation.

The known homogenization methods require several forming or shaping steps that must be carried out at a high temperature. These methods are therefore very consuming in terms of energy and time, and there is the risk that impurities are introduced by molding tools or by the surrounding atmosphere.

It is therefore the object of the present invention to provide an inexpensive method for producing a semifinished product for optically homogeneous quartz glass. It is further the object of the present invention to provide a blank suited for performing the method. Moreover, a suitable use of the semifinished product produced according to the method of the invention or of the blank according to the invention shall be indicated.

As for the method, this object is achieved according to the invention by a method comprising the following steps:
(a) feeding a silicon-containing start compound, which can be converted by oxidation or hydrolysis into $SiO_2$, to a deposition burner, and forming amorphous $SiO_2$ particles in a burner flame assigned to the deposition burner,
(b) forming a substantially solid-cylinder $SiO_2$ blank by depositing the $SiO_2$ particles onto a support with a longitudinal axis in the form of successive layers, of which most extend in parallel with the longitudinal axis of the support and which extend in the direction of the outer surface of the blank, (c) homogenizing the SiO₂ blank, including twisting along an axis of rotation extending coaxially to or in parallel with the longitudinal cylinder axis, while forming the semifinished product.

The description that most of the layers have a characteristic herein means that a majority, i.e., more than half, of the layers have the characteristic, and preferably that almost all, e.g., at least 90%, of the layers have the characteristic.

The invention does for instance not aim at an alternative homogenization method for quartz glass, but focuses on an optimization of the build-up process in the manufacture of synthetic quartz glass, namely with the aim to produce a quartz glass body that can be homogenized in a particularly easy manner so as to minimize the homogenizing efforts.

Twisting a cylindrical initial or start body about the longitudinal axis of the cylinder (or about an axis of rotation extending in parallel therewith) constitutes a comparatively simple method of homogenizing quartz glass. However, as has already been explained above, this simple method is efficient neither in the case of layers concentrically extending relative to the longitudinal cylinder axis (OVD methods) nor in the case of layers axially succeeding one another in the direction of the longitudinal cylinder axis (VAD method) due to an inadequate intermixing of the layers.

On the other hand, the formation of layers is basically unavoidable in the case of the layerwise deposition of SiO₂ particles by means of deposition burners. The attempt can just be made to minimize such formation.

In the light of this the inventor suggests that the layerwise deposition of the SiO₂ particles in the deposition process should be configured such that a substantially cylindrical SiO₂ blank is formed in which, although it still contains layers, most of the layers are neither concentric to the longitudinal cylinder axis nor axial in the direction of the longitudinal cylinder axis, but essentially in parallel therewith. This is with the proviso that most layers, in contrast to a concentric extension, run in the direction of the outer surface of the blank, enclosing with said surface, directly or in its extension, an angle differing from zero.

The layered structure of the blank produced according to the method of the invention is distinguished in that the normal to the surface of the layers extends substantially in a direction perpendicular to the longitudinal axis of the cylinder and that the layers have an extension in the direction of the outer surface of the blank. Such a blank can be homogenized comparatively easily by twisting about an axis of rotation extending in parallel with or in the longitudinal cylinder axis, for due to the fact that most layers extend in parallel with the longitudinal axis of the cylinder and include with the outer surface an angle differing from zero, an intermixing of neighboring layers is achieved during twisting. The steeper the layers leading to the outer surface, i.e. the closer the angle included between outer surface and layer is to 90°, the more efficient is the intermixing of the layers by the twisting operation and the more efficient and faster is the homogenization process.

The homogenizing efforts taken in the use of such a blank (i.e. substantially without concentric or axial layering) for the further processing as an optically homogeneous quartz glass are small. Ideally, one single homogenizing step is enough.

Hence, in the method of the invention an orientation of the layers is set on the basis of the deposition process as is only obtained in known methods by way of complicated first homogenizing methods.

Ideally, the layers that have been produced after the deposition process extend over the whole cross-section of the blank so that they terminate at the surface of the blank. Possible edge layers of the blank that extend in parallel with the longitudinal axis and thus cover the core region of the blank in the manner of a jacket can prevent this. Such edge layers can be removed prior to homogenization, but they are harmless in many cases as long as they do not exceed a thickness of about 10 mm. Edge layers may e.g. be created due to the process during SiO₂ deposition by soot being deposited outside the burner flame proper.

The deposition burner is a plasma burner or a flame hydrolysis burner. The SiO₂ particles are deposited by using such a burner or a plurality of burners that are interconnected in a joint burner arrangement. The relative movement along the longitudinal axis of the support is carried out through reversing movement of the deposition burner(s), or without reversal of the movement of the burner arrangement, as is e.g. described in DE 10 251 390 A1.

After the deposition process the blank is present in the form of a so-called porous soot body or as a vitrified transparent quartz glass body. A soot body can be sintered prior to homogenization, sintering being possibly carried out such that the orientation of the layers of the soot body is also maintained in the vitrified blank.

Homogenization is also simplified in that in contrast to the standard OVD method, which normally results in a hollow cylinder, the blank is produced in the form of a solid cylinder.

If still required, the semifinished product that has been obtained after twisting is subjected to further homogenization measures. As a rule, there is also a shaping into a semifinished product having dimensions similar to the optical component to be produced, for instance by compression in the direction of the longitudinal axis of the blank. After completion of the shaping and homogenizing measures, the quartz glass must be annealed to reduce stresses.

In a particularly preferred embodiment of the method according to the invention, most of the layers terminate at the outer surface of the blank or in the vicinity thereof and include with their end facing the outer surface with said surface an angle ranging between 10° and 170°, preferably between 30° and 150°, and particularly preferably between 60° and 120°.

The steeper the layers or most of the layers extend in the direction of the outer surface of the blank, i.e. the closer the angle included between outer surface and layer is to 90°, and the larger the radial volume portion of the blank is in which such a precondition prevails, the more efficient will be the twisting operation about the axis of rotation. The twisting of the blank about the axis of rotation will be particularly efficient if the layers terminate at the outer surface of the blank or at least in the direct vicinity thereof.

The orientation of the SiO₂ layers inside the blank is already predetermined according to the invention during deposition of the SiO₂ particles. It has turned out to be useful if during deposition of the SiO₂ particles a relative movement is produced between the burner flame and the support, said relative movement having a first component in the direction of the longitudinal axis of the support and a second component in a direction extending perpendicular thereto.

The superimposition of the two movement components of the relative movement between burner flame and support results in a planar occupation of a deposition surface of the support with SiO₂ particles, the deposition surface extending in parallel or substantially in parallel with the longitudinal axis of the support and terminating at the outer surface of the developing blank.

In the simplest case the SiO₂ particles are deposited such that most of the layers extend in parallel with one another and are planar.

Such a layered structure in which most layers are planar layers extending in parallel with the longitudinal axis of the cylinder and at the same time in parallel with one another does not require any special control measures for the setting of the relative movement or the deposition rate of the $SiO_2$ particles and can thus be adjusted in a comparatively easy way.

However, in this procedure some of the layers in the edge region may extend almost tangential to the outer surface in the case of a cylindrical blank having a round or oval cross-section. Moreover, a variant of the method has therefore turned out to be advantageous in which most of the layers have curved areas.

Curved areas permit the adjustment of a layered structure that is particularly optimized with respect to homogenization. For instance, the layers in the case of a cylindrical blank with a round or oval cross-section are curved such that they run over part of their extension, which is as large as possible, within the above-mentioned preferred angular range, ideally 90°, relative to the outer surface of the blank.

It has turned out to be particularly advantageous when a support is used that is provided with a recess extending along its longitudinal axis so as to receive the $SiO_2$ particles.

The elongated recess of the support has a bottom extending along the longitudinal axis of the support with a lateral boundary. Bottom and lateral boundary have, for instance, a U-shaped, V-shaped, semicircular or semi-elliptical cross-section. The recess serves to accommodate the $SiO_2$ particles by the particles being deposited in layers in the recess, as has been explained above. As a result, the recess forms a boundary for the developing blank, thereby simultaneously defining part of the shape of the outer surface of said blank. Hence, the first layer of the layered structure is positioned on the bottom of the recess.

The layers preferably terminate in a vertically extending direction at the lateral wall of the recess. In this respect a situation is undesired where the wall itself constitutes a deposition surface or is already occupied with an $SiO_2$ particle layer. That is why the amplitude of the movement component of the relative movement, which movement component extends perpendicular to the longitudinal axis of the support, is at the most as great as the distance of the recess walls that are opposite each other, and preferably rather smaller than said distance. With a variable distance in a direction perpendicular to the longitudinal axis of the support, e.g. in recesses with V-shaped, parabolic, semielliptical or semicircular cross-section, amplitude and position of the reversal points of said movement component at both sides vary accordingly. A particular advantage of said embodiment of the invention is that the recess is adapted to accommodate a particularly loose layered structure of the $SiO_2$ particles, thereby giving the same a certain mechanical stability. The advantageous effects of said measures shall be explained further below in more detail.

Preferably, the recess for receiving the $SiO_2$ particles is provided with a deposition surface which is shaped in the form of a semi shell.

This shape of the recess facilitates the manufacture of a blank with a round cross-section, which should be preferred for achieving a simple twisting. The cross-section of the recess viewed in the direction of the longitudinal axis of the support forms a parabola, a semicircle, a semiellipse, or a comparatively round shape, the front ends of the semi shell being open or closed. In the case of a cross section with a semielliptical shape, the long main axis of the ellipse extends perpendicular to the semi shell opening.

Particularly preferred is a procedure in which the $SiO_2$ blank according to method step (b) is present as a porous $SiO_2$ soot body, the soot body being sintered prior to homogenization according to method step (c) to obtain a transparent blank.

In this procedure, the porous soot body can be treated prior to homogenization by means of the known measures. To be more specific, it is thereby easily possible to set a predetermined hydroxyl group content or doping in the quartz glass of the blank.

The method according to the invention permits a particularly advantageous method variant in which the $SiO_2$ soot body is formed with a low mean density in the range between 0.22 $g/cm^3$ and 0.55 $g/cm^3$, preferably with a mean density in the range between 0.30 $g/cm^3$ and 0.5 $g/cm^3$.

The soot body of low mean density is deposited on an elongated support which at least grips the soot body over the whole length thereof from below and supports the same, thereby permitting the production of soot bodies having a low mean density in the range between 0.22 $g/cm^3$ and 0.55 $g/cm^3$. Large soot bodies having such a low density can hardly be produced because of their low mechanical stability by way of the traditional methods. The low density, however, has the advantage that cleaning, drying or doping measures can be taken in a particularly efficient and rapid way. At a mean density of less than 0.22 $g/cm^3$, the increasing handling problems outweigh the advantage of a rapid and improved cleaning or doping process. The mean density of the blank is determined without destruction by way of computer tomography, which also yields a complete density profile.

Especially in the case of soot bodies having a particularly low initial density, it is however of advantage to the further processing of the soot body after drying, cleaning or doping if said body shows an increased mechanical stability.

Therefore, a preferred modification of the method as has just been explained is distinguished in that prior to sintering the soot body of low mean density is subjected to a pre-sintering process in which its mean density is set to a value of more than 0.55 $g/cm^3$, preferably to at least 0.77 $g/cm^3$.

Pre-sintering is carried out after drying and cleaning of a soot body with an extremely low density, as has been described above, and it is performed before the sintering process proper. Pre-sintering and sintering of the soot body can also be performed in one operation and in the same furnace.

Preferably, prior to sintering, the soot body is treated in a horizontally supported position in a dry atmosphere.

This treatment of the soot body is e.g. a drying or cleaning process, or a pre-sintering process, as has been explained above. The horizontal rest or support also permits such a treatment if the soot body has a low density and a correspondingly poor mechanical stability. The support used in the deposition process or another propping device serves as the rest or support.

Especially with respect to the fact that the blank is subjected to a twisting process, it has turned out to be advantageous when the $SiO_2$ blank has a first end and a second end opposite to the first end in the direction of a central axis of the blank, with a holder being embedded into the first blank end during deposition of the $SiO_2$ particles, said holder extending to the outside in the central axis of the blank.

During twisting about the axis of rotation the blank is held on the holder. The holder may also serve handling purposes in possible drying, cleaning or sintering processes. Preferably, such a holder is embedded into the second blank end opposite to the first blank end in such a manner that first holder and second holder are opposite each other along the central axis of the blank.

As for the blank for an optical component of synthetic quartz glass of high homogeneity, the above-indicated object starting from the above-indicated layer-containing porous $SiO_2$ soot body is achieved according to the invention in that most of the layers extend in parallel with the longitudinal axis of the soot body and in the direction of the outer surface of the soot body.

The $SiO_2$ blank according to the invention is particularly obtained by means of the above-described method. It is distinguished by a layered structure that can be intermixed particularly easily by twisting after vitrification with formation of a cylindrical semifinished product and homogenized into a homogeneous quartz glass body.

To this end most of the layers found in the porous $SiO_2$ blank extend such that the normal to the surface of the layers extends substantially in a direction perpendicular to the longitudinal axis of the blank and that the layers have an extension in the direction of the outer surface of the soot body. After vitrification with formation of a quartz glass cylinder, such a soot body can be homogenized relatively easily by twisting about an axis of rotation extending in parallel with or in the longitudinal axis of the cylinder, for the fact that most of the layers extend in parallel with the longitudinal axis of the cylinder and include, with the outer surface, an angle differing from zero results in an intermixing of neighboring layers during twisting. The steeper the layers leading to the outer surface, i.e. the closer the angle included between outer surface and layer is to 90°, the more efficient is the intermixing of the layers by the twisting operation and the more efficient and faster is the homogenization process.

Therefore, the homogenizing efforts in the use of such a quartz glass cylinder without concentric or axial layer sequences for the further processing as an optically homogeneous quartz glass are small. Ideally, one single homogenizing step is enough, the homogenization of the quartz glass cylinder being also simplified in that in contrast to the standard OVD method, which normally yields a hollow cylinder, the quartz glass cylinder is present in the form of a solid cylinder.

Advantageous developments of the blank according to the invention become apparent from the subclaims. Insofar as developments of the blank indicated in the subclaims imitate the procedures mentioned in subclaims regarding the method according to the invention, reference is made to the above observations regarding the corresponding method claims for supplementary explanation.

The semifinished product produced and homogenized according to the method of the invention, and the blank according to the invention are particularly suited for the production of an optical lens of a projection or exposure system of a microlithographic device.

Furthermore, the blank according to the invention is particularly suited for producing a preform for optical fibers.

Figure 2:
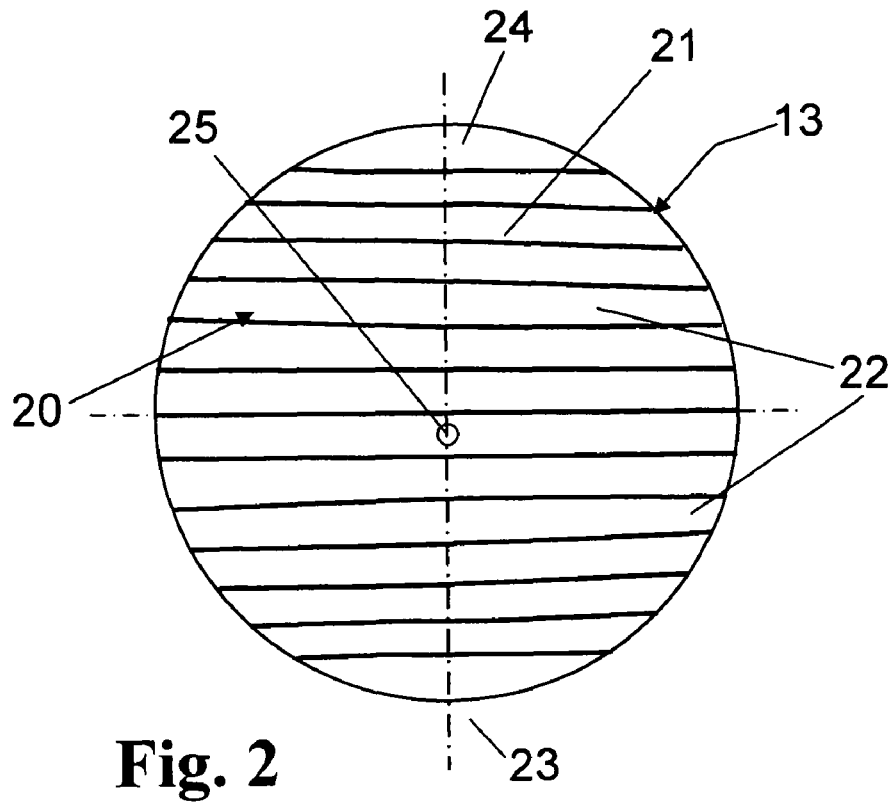
Figure 3:
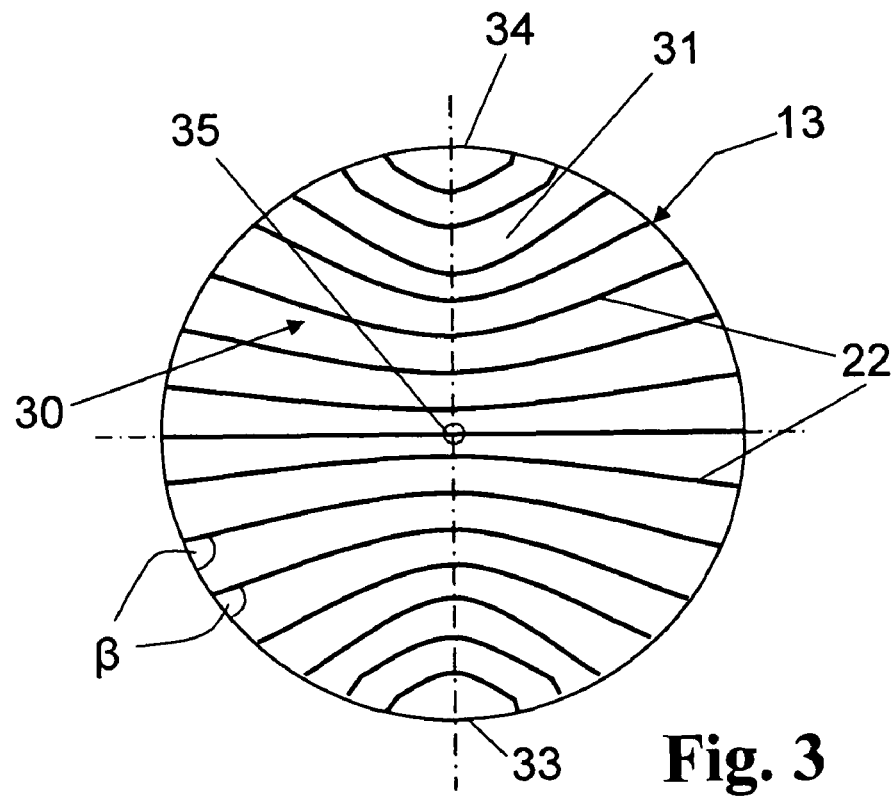

The invention shall now be explained in more detail with reference to embodiments and a drawing. The drawing is a schematic illustration showing in detail in FIG. 1 an apparatus for performing the method of the invention, partly in section;

FIG. 2 a layered structure of a blank produced according to the method of the invention, viewed in a direction of the longitudinal axis of the blank;

FIG. 3 a further layered structure of a blank produced according to the method of the invention, viewed in a direction of the longitudinal axis of the blank;

FIG. 4 an embodiment of a blank of the invention, contained in a support mold, viewed in a direction of the longitudinal axis of the blank.

EXAMPLE 1

FIG. 1 schematically shows an arrangement for producing an $SiO_2$ blank which can be easily homogenized by twisting. A soot body 1 with a particular layered structure is produced by flame hydrolysis of $SiCl_4$ by layerwise deposition of $SiO_2$ particles on a support body. Instead of the standard outside deposition in the OVD method on a rotating support body, the soot body 1 is built up by means of a burner arrangement 2 in a fixed elongated support mold 3 of aluminum oxide shaped in the form of a semi shell. The support mold 3 is upwardly open and has a semicircular cross-section. Alternative materials for the support mold 3 are e.g. aluminum oxide, graphite, carbon fiber reinforced graphite (CFC), or quartz glass.

The burner arrangement 2 consists of a plurality of deposition burners 5 mounted on a joint burner bank 4, which extend in parallel with the longitudinal axis 6 of the support mold. The burner arrangement 2 is here arranged in inclined fashion above the support mold 3, so that the main propagation direction 11 of the burner flames 7 are oriented downwards towards the opening of the support mold 3 in inclined fashion at an angle α of about 30° relative to the vertical 12. To this end the support mold 3 is also tilted relative to the vertical 11 by the angle α such that the main propagation direction 11 of the burner flames 7 extends in a direction perpendicular to the support mold opening. Exhaust gases are discharged vertically upwards. As an alternative to the burner arrangement 2, the deposition process may also be preformed with one single deposition burner. This, however, is less efficient.

The burner arrangement 2 performs a reversing movement relative to the support mold 3 in the direction of the longitudinal axis 6 of the support mold, said movement being superposed by a transverse movement in the direction perpendicular thereto, as outlined by directional arrows 8. The amplitude of the transverse movement corresponds to the distance between the opposite inner walls of the support mold 3 at the height of the current deposition surface. On the whole, this yields a zigzag-like movement sequence, on account of which the support mold 3 is filled up gradually and layerwise with $SiO_2$ soot particles. During deposition of the upper part of the soot body 1, with the upper part projecting out of the support mold 3, the movement sequence of the deposition burners 5 is on the whole in mirror symmetry with the configuration of the lower part, resulting in a soot body 1 with a substantially round cross-section and mirror-symmetrical layered structure. The support mold 3 forms the boundary for the lower part of the developing soot body 1, whereas the outer shape of the upper part of the soot body 1, which upper part is projecting out of the mold 3, is defined by the movement sequence of the deposition burners 5.

This creates $SiO_2$ particle layers which are positioned one on top of the other and extend along the longitudinal axis 6 of the support and in the direction of the outer cylindrical surface of the support 3. Since the deposition burners 5 in their movement sequence are not switched off at the end of a movement cycle, each of the deposition burners 5 produces, strictly speaking, a continuous layer which extends in folds or meanders, superimposing itself and neighboring layers in this process.

As an alternative to the above-described embodiment, the transverse movement is carried out by an oscillating displacement of the support mold 3 about its longitudinal axis.

Round rods 9 of $Al_2O_3$ are embedded into the developing soot body 1 during the deposition process at both sides, said rods projecting some distance out of the front soot body ends and extending in the central axis 10 of the soot body. The round rods 9 will only be placed on the deposition surface if this surface has reached the upper edge of the support mold 3.

The temperature of the deposition burners 5 in the area of the flame impingement point on the soot body 1 is measured by means of a pyrometer (not shown), the measured value being used for regulating the fuel gas supply. The surface temperature is kept at a constant value to ensure a density profile as homogeneous as possible over the wall thickness of the soot body 1. The distance between the deposition burners 5 and the outer cylindrical surface 13 of the developing soot body 1 is kept constant.

The resulting soot body 1 is present in the form of a solid cylinder with a round cross-section and has a weight of about 100 kg. Its mean density is determined by way of a computer tomographic measurement to be 0.62 g/cm$^3$.

The soot body 1 is vitrified into a transparent quartz glass blank. To this end the embedded round rods 9 are removed and replaced by threaded rods of quartz glass that are screwed into the bore left by the round rods 9. The threaded rods serve the vertical mounting in a vitrification furnace. The soot body 1 is vitrified at a temperature around 1600° C. under vacuum ($10^{-2}$ mbar). The round cross-sectional shape of the soot body 1 is also substantially maintained in the vitrified quartz glass blank.

The SiO$_2$ particle layers produced in the deposition process extend in the simplest case in parallel with the longitudinal axis 10 of the soot body and the longitudinal axis 6 of the support mold and are not curved, as is schematically shown by the layered structure 20 illustrated in FIG. 2 in the case of a blank 21 that has been obtained by vitrifying the soot body 1 produced according to the method of the invention.

The boundary surfaces between the individual layers are plotted as lines 22. Reference numeral 23 is assigned to the bottom side of blank 21, the outer shape of which is predetermined by the abutment in the support mold 3, and reference numeral 24 is assigned to the top side, the outer shape of which is determined without any tool solely by the control of the movement sequence during SiO$_2$ particle deposition. The blank 21 has a round cross-section on the whole. As follows from the cross-sectional illustration in FIG. 2, all layers 22 terminate at the outer cylindrical surface 13 of the blank 21, and the layers 22 intersect the outer cylindrical surface 13 at an angle of about 90° in the vicinity of the central axis 25 of the blank, whereas said angle of intersection gets gradually flatter (or more acute) in the case of the layers 22 following in the direction of top side 24 and bottom side 23.

The layered structure 21 is in mirror symmetry with a mirror plane extending through the central axis 25 of the blank.

The vitrified blank 21 comprising the layered structure 20 is then homogenized by thermally mechanical homogenization (twisting) and formation of a quartz glass cylinder. During twisting, the blank 21 is heated zonewise and twisted in the softened region about its longitudinal axis. Due to the optimized layered structure 20, the twisting process suffices for obtaining an optically homogeneous quartz glass.

The homogenized quartz glass blank 21 is compressed in a final step into a cylinder having a thicker cross-section, which serves as a semifinished product for making an optical quartz glass lens.

EXAMPLE 2

A soot body 1 is produced by flame hydrolysis of SiCl$_4$, as described with reference to Example 1. By contrast, however, a support mold 3 consisting of quartz glass is used for forming and receiving the soot body 1 in the shape of an upwardly open semi shell. To avoid any connection between the surface of the support mold 3 of quartz glass and the soot body 1 deposited therein, an SiO$_2$ particle layer of a particularly low density is first of all produced, which covers the whole inner wall of the support mold 3 in the form of a soot layer having a thickness slightly less than 1 mm, and which facilitates the removal of the soot body 1 after completion of the deposition process. For producing said soot layer, the surface temperature is kept particularly low during the deposition process.

A burner arrangement 2, as has been described with reference to Example 1, is used for the deposition of the SiO$_2$ particles for producing the soot body 1. In the movement sequence of the burner arrangement 2, a program-controlled displacement of the reversal points of the reversing movement along the longitudinal axis 6 of the support mold is provided in addition to the reversing movement. Moreover, an optimized layered structure is produced, which structure will be described in more detail further below with reference to FIG. 3. To this end the SiO$_2$ particle deposition is first of all carried out in a small deposition area on the bottom of the support mold 3, and said deposition area is enlarged first only at a relatively slow pace with an increasing thickness of the SiO$_2$ particle layer. As soon as the overall SiO$_2$ particle layer has a thickness corresponding approximately to a quarter of the diameter of the soot body 1 to be produced, the following individual SiO$_2$ particle layers are built up more strongly on the edge portion than in the center, which results in a layer that is as straight as possible after the first half of the deposition process has passed. The thickness of the SiO$_2$ particle layers is adjusted through the speed of the burner movement. The build-up in the second half of the deposition process is substantially carried out in mirror-inverted fashion with respect to the build-up in the first half.

A soot body 1 is produced which is distinguished by a particularly low density in the range of 0.45 g/cm$^3$. This low density is made possible by the supporting function of the quartz glass mold 3 and the lying arrangement with a horizontal orientation of the longitudinal axis 6 of the soot body.

The soot body 1 is distinguished by a particularly low density which permits a particularly efficient cleaning and drying of the soot body 1. On the other hand, however, its mechanical stability is also low. Therefore, the soot body 1 is dried in a lying position in its mold 3. Drying is performed at 1000° C. in vacuum ($10^{-2}$ mbar).

Subsequently, the dried soot body 1 is pre-sintered for increasing its density at a temperature of 1300° C. in a still horizontal orientation already in the quartz glass mold. This yields a density of about 0.8 g/cm$^3$, the round shape of the soot body 1 being substantially maintained and a fixed joint being produced with the previously inserted threaded rods (as explained with reference to Example 1).

Depending on the intensity of the drying process, the resulting soot body is distinguished by a small hydroxyl group content, and it is particularly well suited, also without homogenization treatment, for the manufacture of a preform for optical fibers or parts of such a preform.

By contrast, a homogenization treatment is needed for the use of the soot body 1 for making an optical lens for a microlithographic system, as will be explained in more detail in the following.

The final zonewise vitrification of the pre-sintered soot body 1 after removal from the mold 3 is carried out in vertical orientation at a temperature of 1600° C. in vacuum. This yields a transparent quartz glass blank 31 with a layered structure as shown in FIG. 3.

Said blank is subsequently twisted and shaped into a semifinished product for an optical lens, as has been described above with reference to Example 1. Thanks to the optimized layered structure 30 (FIG. 3), a simple twisting process suffices for obtaining an optically homogeneous quartz glass.

The layered structure of the soot body 1 as produced according to Example 2 is particularly optimized with respect to the homogenization process by way of twisting. FIG. 3 schematically shows the layered structure 30 in the blank 31 obtained after vitrification of the soot body 1. This structure is characterized in that the layers 22 terminate at the outer cylindrical surface 13 of the blank 31 and include with said surface an angle β that differs as little as possible from 90°. The layered structure 30 of the bottom side 33 of the blank 31, said bottom side being defined in its dimensions by the quartz glass mold 3, and the top side 34 of the blank 31 produced without a tool are in mirror symmetry relative to the horizontal plane extending through the central axis 35. The blank 31 has a round cross-section on the whole. The layered structure 30 provides a particularly efficient intermixing of neighboring layers 22 upon twisting of the blank 21 about the central axis 35 of the blank.

EXAMPLE 3

A soot body 1 is produced by flame hydrolysis of SiCl$_4$, as has been described with reference to Example 1. SiO$_2$ particles are deposited in layers in a mold 40 (see FIG. 4) by means of a burner arrangement consisting of a plurality of burners arranged one after the other. The burner arrangement is here guided without reversal of its direction of movement along a loop-like movement path with two intersecting loop sections, a left-hand twisting of the medium supply lines taking place in the first loop section for the supply of medium to the deposition burners, and a right-hand twisting of the medium supply lines in the second loop section, so that the twisting processes of the medium supply lines compensate one another during each run via the path of movement. This procedure, which is described in DE 10 251 390 A1, avoids changes in homogeneity in the area of the reversal points of the burner movement.

A mold 40 of high-purity graphite in the form of a semi shell is arranged along each of the two loop sections, with SiO$_2$ particles being deposited into said mold with simultaneous formation of two soot bodies and said particles being built up as has been described above with reference to Example 2. Viewed in cross-section perpendicular to its longitudinal axis, the graphite mold 40 forms a semi-ellipse whose long main axis extends in the direction of the main propagation direction of the burner flame, said long main axis being twice as long as the short main axis (FIG. 4).

The transverse movement is carried out in a direction perpendicular to the transversal movement of the deposition burners 5 in the direction of the longitudinal axis 6 of the mold by way of a corresponding continuous displacement of the mold 40 in a direction perpendicular to its longitudinal axis 6. The incorporation of round rods at the front side is omitted in this embodiment. The resulting soot body 21 has a substantially elliptical cross-section, a particularly low mean density of about 0.35 g/cm$^3$ and has a layered structure similar to the one shown in FIG. 2.

After the deposition process has been completed, annealing and drying are carried out in vacuum at a temperature of 1200° C. in the horizontal orientation of the soot body 1, as has been described with reference to Example 2. The soot body 1 remains within the graphite mold 40.

After drying the soot body 1 is heated in a horizontally lying position isothermally to a temperature of around 1600° C. and is completely vitrified in this process. The volume of the soot body 1 is here shrinking to about ⅕ of its original value with formation of a vitreous mass. Due to the horizontal orientation the vitreous mass flows under its own weight, thereby collecting in the lower part of the graphite mold 40 as shown in FIG. 4. The resulting quartz glass blank 41 has an approximately polygonal cross-section (triangular shape) that is predetermined by the elliptical accommodation by the graphite mold 40 and by the formation of a free melt surface during vitrification, and has partly rounded edges. The layered structure 42 obtained in the soot body 1 is substantially maintained in the vitrified blank 41. The longitudinal axis 43 of the blank extends in a direction perpendicular to the sheet plane. The layers 22 terminate at the outer cylindrical surface 13, and the end thereof facing the outer cylindrical surface 13 includes a steep angle (if possible, of about 90°) with said surface.

The vitrified blank 41 is subsequently homogenized and shaped by thermally mechanical homogenization (twisting about the longitudinal axis 43 of the blank) and formation of a semifinished product in cylindrical form, as has been described above with reference to Example 2.

After completion of the vitrification process a minor mechanical treatment might be useful, for instance for removing defective surface areas on which the soot body was positioned during the deposition process, or for rounding off edges. After the twisting operation the resulting quartz glass cylinder is subjected to an annealing treatment for removing mechanical stresses and for avoiding birefringence.

The invention claimed is:

1. A method for producing a semifinished product for an optical component of synthetic quartz glass of high homogeneity, the method comprising:
   (a) feeding a silicon-containing start compound, which can be converted by oxidation or hydrolysis into SiO$_2$, to a deposition burner, and forming amorphous SiO$_2$ particles in a burner flame associated with the deposition burner;
   (b) forming a substantially solid-cylinder SiO$_2$ blank by depositing the SiO$_2$ particles onto a support with a longitudinal axis in successive layers, most of said layers extending in parallel with the longitudinal axis of the support and extending toward and ending at an outer cylindrical surface of the blank; and
   (c) homogenizing the SiO$_2$ blank, including twisting along an axis of rotation extending coaxially to or in parallel with the longitudinal axis while forming the semifinished product.

2. The method according to claim 1, wherein most of the layers terminate at the outer cylindrical surface of the blank and define an angle between an end thereof facing the outer surface and said outer surface, said angle being between 10° and 170°.

3. The method according to claim 2, wherein the angle is between 30° and 150°.

4. The method according to claim 2, wherein the angle is between 60° and 120°.

5. The method according to claim 1, wherein a relative movement is produced between the burner flame and the support, the relative movement having a first component in the direction of the longitudinal axis of the support and a second component in a direction perpendicular to said longitudinal axis.

6. The method according to claim 1 wherein most of the layers are substantially planar and extend in parallel with one another.

7. The method according to claim 1, wherein most of the layers have curved areas.

8. The method according to claim 1, wherein the support has a recess therein extending along the longitudinal axis so as to receive the $SiO_2$ particles.

9. The method according to claim 8, wherein a deposition surface within the recess is shaped in the form of a half shell.

10. The method according to claim 1 wherein the $SiO_2$ blank of method step (b) is a porous $SiO_2$ soot body, and prior to the homogenization of method step (c), the soot body is sintered to obtain a transparent blank.

11. The method according to claim 10, wherein the $SiO_2$ soot body has a low mean density in a range between 0.22 $g/cm^3$ and 0.55 $g/cm^3$.

12. The method according to claim 11, wherein the soot body of low mean density is subjected to a pre-sintering process prior to sintering in which the mean density thereof is set to more than 0.55 $g/cm^3$.

13. The method according to claim 12, wherein the mean density is set to at least 0.77 $g/cm^3$.

14. The method according to claim 11 wherein the $SiO_2$ soot body has a mean density in a range between 0.30 $g/cm^3$ and 0.50 $g/cm^3$.

15. The method according to claim 10, wherein, prior to sintering, the soot body is treated in a horizontally lying position in a drying atmosphere.

16. The method according to claim 1, wherein the $SiO_2$ blank has a first end and a second end opposite to said first end in a direction of a central axis of the blank, and wherein during deposition of the $SiO_2$ particles a holder is embedded into the first end of the blank, said holder extending beyond the end of the blank in the central axis of the blank.

17. A method for producing a semifinished product for an optical component of synthetic quartz glass of high homogeneity, the method comprising:
 (a) feeding a silicon-containing start compound, which can be converted by oxidation or hydrolysis into $SiO_2$, to a deposition burner, and forming amorphous $SiO_2$ particles in a burner flame associated with the deposition burner;
 (b) forming a substantially solid-cylinder $SiO_2$ blank by depositing the $SiO_2$ particles onto a support with a longitudinal axis in successive layers that extend in parallel with the longitudinal axis of the support, and extend toward and end at an outer cylindrical surface of the blank; and
 (c) homogenizing the $SiO_2$ blank, including twisting along an axis of rotation extending coaxially to or in parallel with the longitudinal axis while forming the semifinished product.

18. The method according to claim 17, wherein the layers terminate terminate at the outer cylindrical surface of the blank and define an angle between an end thereof facing the outer surface and said outer surface, said angle being between 10° and 170°.

19. The method according to claim 17 wherein the layers are substantially planar and extend in parallel with one another.

20. The method according to claim 17 wherein the layers have curved areas.

21. The method according to claim 17, wherein the layers terminate terminate at the outer cylindrical surface of the blank and define an angle between an end thereof facing the outer surface and said outer surface, said angle being between 30° and 150°.

22. The method according to claim 17, wherein the layers terminate terminate at the outer cylindrical surface of the blank and define an angle between an end thereof facing the outer surface and said outer surface, said angle being between 60° and 120°.

* * * * *